US 6,712,424 B2

(12) United States Patent
Swain

(10) Patent No.: US 6,712,424 B2
(45) Date of Patent: Mar. 30, 2004

(54) HITCH RECEIVER MOUNTED SPOILER

(76) Inventor: Daniel B. Swain, 9 Genesee St., Scottsville, NY (US) 14546

( * ) Notice: Subject to any disclaimer, the term of this patent is extended or adjusted under 35 U.S.C. 154(b) by 38 days.

(21) Appl. No.: 10/134,811

(22) Filed: Apr. 29, 2002

(65) Prior Publication Data

US 2003/0201289 A1 Oct. 30, 2003

(51) Int. Cl.$^7$ ................................................. B64C 3/58
(52) U.S. Cl. ................. 296/180.1; 224/519; 296/180.5
(58) Field of Search ........................... 296/180.1, 180.5, 296/180.4; 224/500, 519

(56) References Cited

U.S. PATENT DOCUMENTS 6,170,904 B1 * 1/2001 Schaedlich et al. ...... 296/180.1
2002/0163223 A1 * 11/2002 Lehmann ................ 296/180.1

* cited by examiner

Primary Examiner—Joseph D. Pape
(74) Attorney, Agent, or Firm—Brennan Swain

(57) ABSTRACT

A spoiler assembly that is adapted to be connected to the hitch of a vehicle. The spoiler assembly includes a coupling member adapted to be coupled with the vehicle's hitch, an intermediate portion extending upwardly from the coupling portion, a spoiler portion having opposite ends that is connected to the intermediate portion, and at least two stabilization members. The intermediate portion has first and second sections that are in a telescoping relationship to provide adjustability in a vertical direction. The spoiler portion includes a cross bar affixed to the second portion of the intermediate portion, a spoiler, and a plurality of adjustment members that are affixed to the spoiler. The adjustment members each have an opening defined therethrough that collectively receive the cross bar. The adjustment members also each include at least one threaded fastener that can be tightened and loosened to allow the spoiler to be movable relative to the cross bar. The two stabilization members each include a generally vertically oriented cable member extending downwardly from an end of the and a stabilization extension having opposite ends. One end of the cable members is affixed to an end of the stabilization extension and the second end of the stabilization extension is adapted to be coupled to the vehicle hitch or frame.

22 Claims, 5 Drawing Sheets

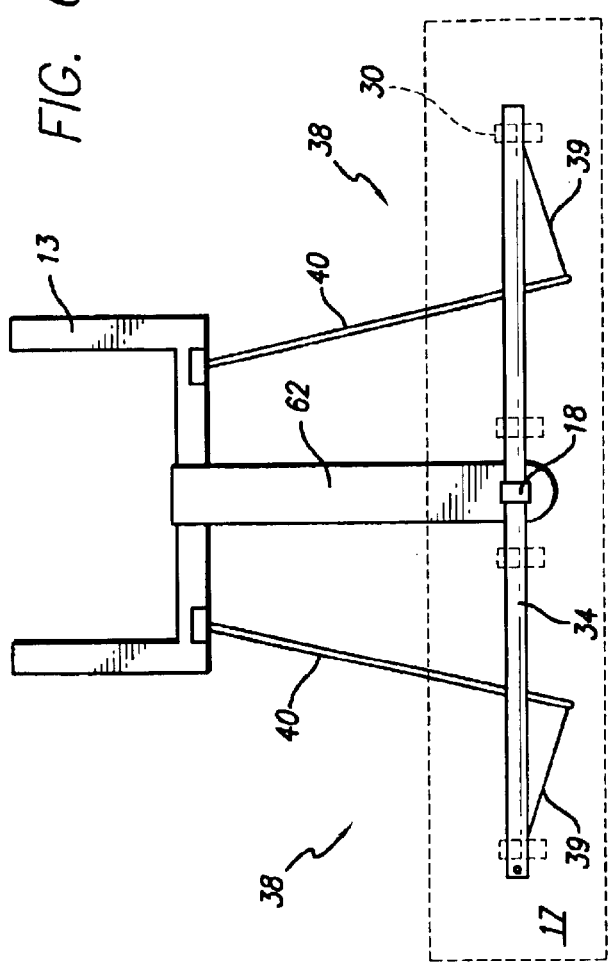
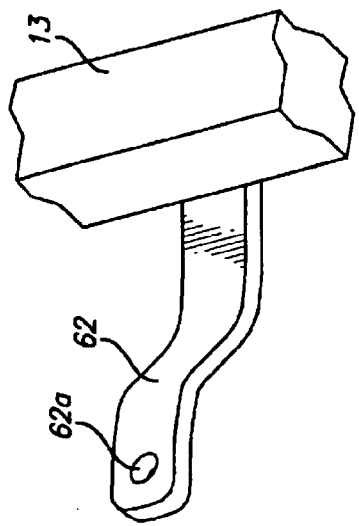
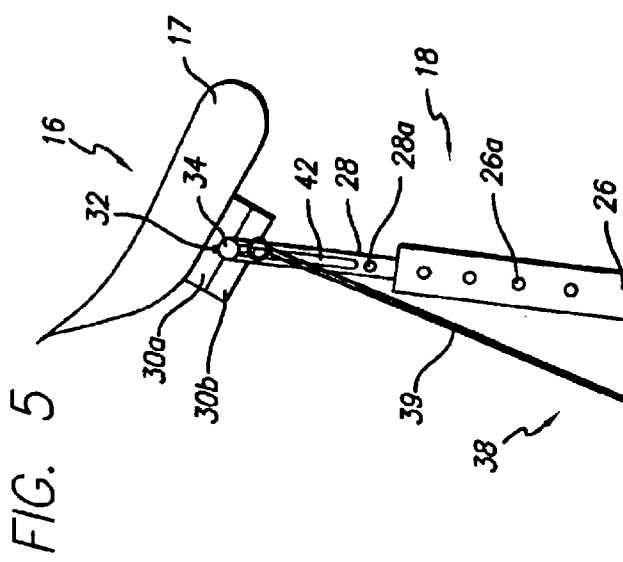
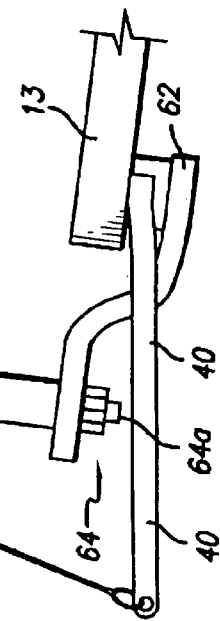
FIG. 6
FIG. 7
FIG. 5

US 6,712,424 B2

HITCH RECEIVER MOUNTED SPOILER

FIELD OF THE INVENTION

The present invention relates to spoilers and more particularly to a vehicle hitch mounted spoiler for affecting the traction for a vehicle.

BACKGROUND OF THE INVENTION

As is well known in the automobile industry a rear spoiler or wing creates down force and better traction and handling capabilities for automobiles. Particularly, in the automobile racing industry large wings are often used on the back of race cars to provide down force and increase the traction of the rear wheels.

However, installation of such a rear spoiler or wing is often difficult, time consuming and expensive. The small-time racer or car enthusiast that is not well funded may not be able to install such a wing without a lot of time, money and expertise. Also, for those car enthusiasts that race their cars on the weekends, but drive them on the road during the rest of the week, they may not want a large wing hanging off the back of their car during the commute to work.

Accordingly, a need exists for a rear wing or spoiler that is easy to install and remove and that is relatively inexpensive.

SUMMARY OF THE PREFERRED EMBODIMENTS

In accordance with one aspect of the present invention there is provided a spoiler assembly adapted to be connected to the hitch receiver of a vehicle. The spoiler assembly includes a coupling member adapted to be coupled with the vehicle's hitch receiver, an intermediate portion extending upwardly from the coupling portion, a spoiler portion having opposite ends that is connected to the intermediate portion, and at least two stabilization members. The intermediate portion has first and second sections that are in a telescoping relationship to provide adjustability in a vertical direction. The spoiler portion includes a cross bar affixed to the second portion of the intermediate portion, a spoiler, and a plurality of adjustment members that are affixed to the spoiler. The adjustment members each have an opening defined therethrough that collectively receive the cross bar. The adjustment members also each include at least one threaded fastener that can be tightened and loosened to allow the spoiler to be movable relative to the cross bar. The two stabilization members each include a generally vertically oriented cable member extending downwardly from an end of the and a stabilization extension having opposite ends. One end of the cable members is affixed to an end of the stabilization extension and the second end of the stabilization extension is adapted to be coupled to the vehicle hitch receiver or frame.

According to another aspect of the invention, there is provided a spoiler assembly that includes a coupling member adapted to be coupled to the hitch receiver of a vehicle, an intermediate portion extending upwardly from the coupling portion, and a spoiler portion connected to the intermediate portion. In a preferred embodiment, the second section of the intermediate portion is received in the first section, and the first and second sections each have a plurality of corresponding apertures defined therein. A fastener is received in one of the openings in the first section and a corresponding opening in the second section to prevent longitudinal movement of the first section relative to the second section. The at least one adjustment member has an opening defined therethrough that receives the cross bar. The at least one adjustment member can be tightened and loosened to allow the spoiler to be movable relative to the cross bar. In another preferred embodiment the spoiler assembly includes at least one stabilization member having first and second opposite ends. The first end is connected to the spoiler portion and the second end is adapted to be coupled to a vehicle.

In accordance with yet another aspect of the present invention, there is provided a method of affixing a spoiler assembly to a vehicle. The method includes the step of coupling a coupling portion of the spoiler assembly to a hitch receiver affixed to the vehicle. In a preferred embodiment the hitch receiver includes a receiver tube and the method also includes the steps of inserting the coupling portion into the receiver tube and inserting a fastener through an aperture in the receiver tube and a corresponding aperture in the coupling portion.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 5 is a side elevational view of a spoiler assembly adapted to ve received on a blade-type receiver hitch in accordance with a second embodiment of the present invention.

FIG. 6 is a top plan view of the spoiler assembly of FIG. 5 showing the spoiler in phantom.

FIG. 7 is a perspective view of a blade-type hitch receiver.

Like numerals refer to like parts throughout the several views of the drawings.

DETAILED DESCRIPTION OF THE PREFERRED EMBODIMENTS

Figure 1:
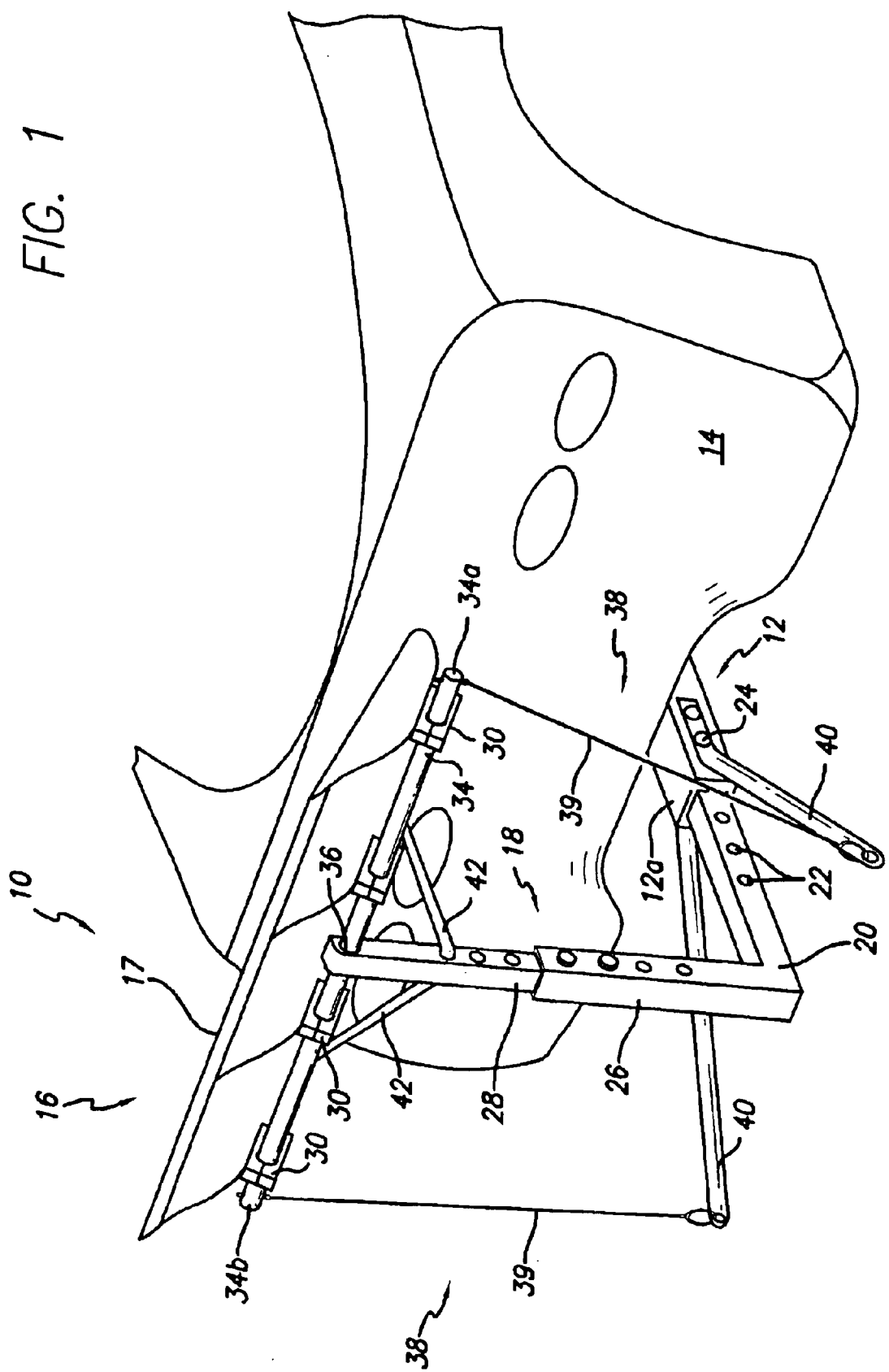
FIG. 1 is a perspective view showing a receiver hitch mounted spoiler assembly mounted on a conventional receiver style hitch of a vehicle in accordance with a first embodiment of the present invention.

Referring to FIGS. 1–4, a preferred embodiment of a spoiler assembly 10 adapted to be detachably mounted to a vehicle via a standard trailer hitch (such as a receiver hitch 12) or the like is shown. For exemplary purposes only, the following disclosure will describe the spoiler assembly 10 as mounted on a conventional trailer hitch receiver (referred to herein as a receiver hitch) 12 having a square cross-section (as shown in FIG. 1). The conventional receiver style hitch 12 in the disclosure is mounted on the frame 13 of a vehicle 14, such as a car. It will be understood, however, that a spoiler assembly 10 constructed in accordance with the present invention can be mounted on any conventional receiver style hitch. It will be further understood that the object (exemplified herein by a vehicle) that the conventional receiver style hitch is connected to is in no way a limitation on the present invention.

It will be appreciated that terms such as "upwardly," "forward, "rearward" "top" and "downwardly" used hereinbelow are merely for ease of description and refer to the orientation of the components as shown in the Figures. It should be understood that any orientation of hitch mounted spoiler assembly 10 described herein is within the scope of the present invention. As used herein, the different hitches described are considered part of the vehicle 14.

Vehicles often include a hitch permanently or detachably mounted at the rear thereof. A hitch ball is a typical and most widespread type of hitch used. The hitch ball is typically connected to the vehicle in one of two ways (1) via a tubular hitch receiver or (2) by a draw-bar or blade that has a hole in it (as shown in FIG. 7). The present invention makes use of these hitch connections to detachably mount a spoiler assembly to the vehicle. It will be understood that other methods or components for hitching a component (whether it be a trailer, bike rack or the like) to a vehicle are known (such as a clevis), and all such hitching methods or components are within the scope of the present invention.

It should be understood that any spoiler, wing or mechanism that provides down force via airflow and that is adapted to be removably mounted on a vehicle is within the scope of the present invention. The spoiler can also be used to create uplift. In a preferred embodiment, the hitch mounted spoiler assembly 10 includes a spoiler portion 16, an intermediate portion 18 (generally referred to herein as an elongated strut 18) and a coupling member 20. Generally, the spoiler portion 16 is an air deflector for reducing the tendency of the vehicle 14 to lift off the road at high speeds, the coupling member 18 is removably coupled to the vehicle 14 (typically to the frame 13) and the elongated strut 18 connects the coupling member 18 to the spoiler portion 16. In a simple embodiment, the present invention includes these three components. It will be appreciated that those skilled in the art will be able to make numerous modifications to the present invention using these three components. Any such modifications are within the scope of the present invention. Furthermore, the type of spoiler used is not a limitation on the present invention.

Figure 3:
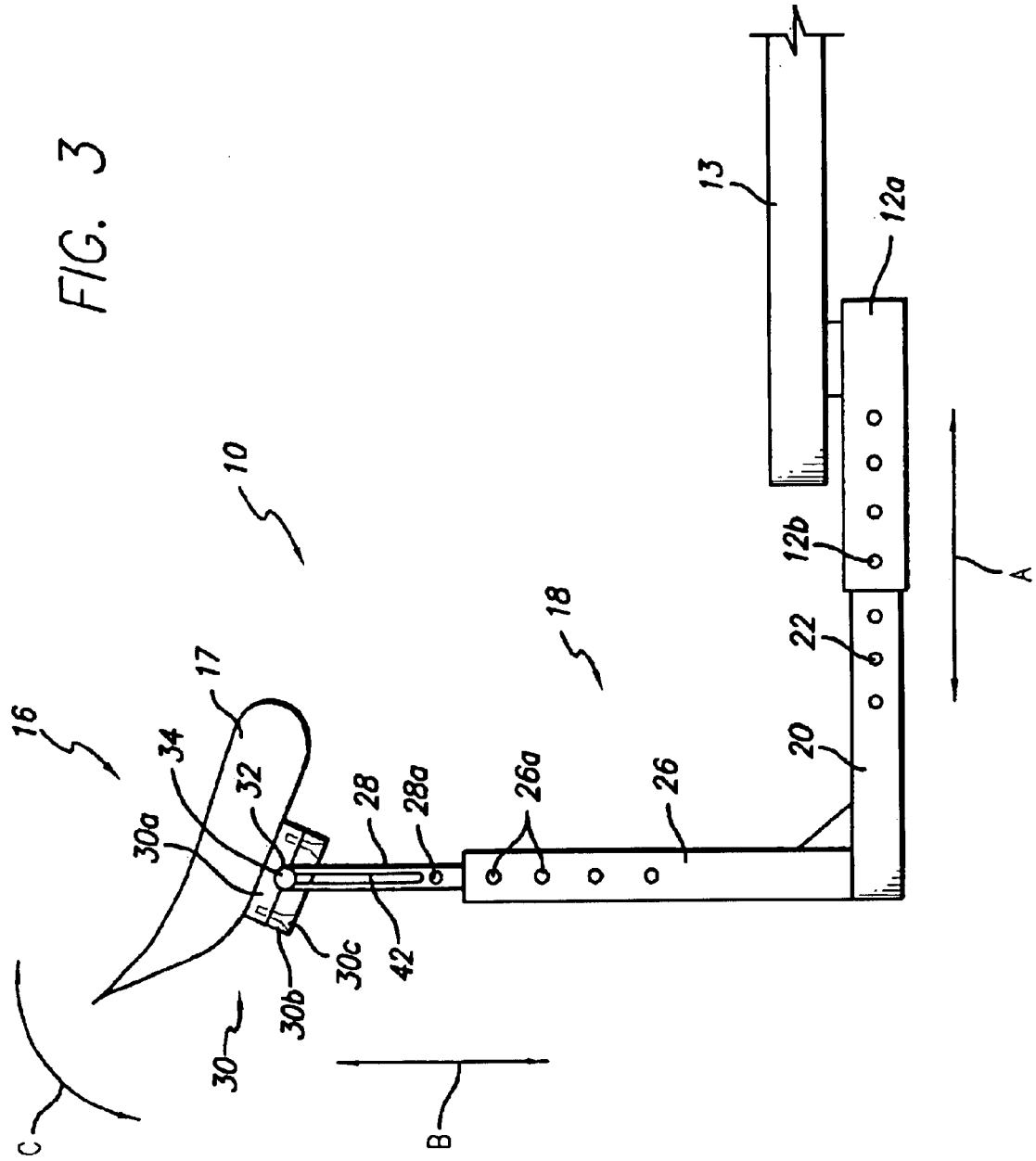
FIG. 3 is a side elevational view of the spoiler assembly of FIG. 1 with the side cables omitted.

In a first embodiment of the present invention the hitch mounted spoiler assembly 10 is designed to be used in conjunction with a receiver hitch 12 that includes a receiver tube 12a. The coupling member 20 includes at least one aperture 22, and preferably a series of apertures 22, adapted to receive a threaded fastener (such as a bolt and nut or screw) 24, hitch pin, rod or the like (all defined herein as a fastener) defined therethrough. The apertures 22 are preferably formed in the coupling member 20 at a predetermined location, such that when the coupling member 18 is slidably engaged with the receiver tube 12a of the vehicle 14, at least one aperture 22 is in alignment with a matching aperture 12b defined in the receiver tube 12a, as is illustrated in FIG. 3. Preferably, the threaded fastener 24 is insertable through apertures 12b and 22, thereby removably securing the coupling member 20 (and, therefore, the hitch mounted spoiler assembly 10) to the receiver hitch 12. It will be understood that any means for removably securing the hitch mounted spoiler assembly 10 to the receiver hitch 12 is within the scope of the present invention. For example, a cotter pin, other pins, threaded fasteners, clamps and the like may be provided.

The class of receiver hitch (class I, II, III, etc.) that the coupling member 20 is adapted to engage is not a limitation on the present invention. Adaptors can be used to provide for a substantially proper fit between the coupling member 20 and the receiver tube 12a of the receiver hitch 12. Such adaptors are well known in the art. Providing the proper adaptors allows the hitch mounted spoiler assembly 10 to fit any conventional receiver style hitch. For example, in an alternative embodiment, the coupling member 20 can by hollow and be coupled with a male hitch receiver.

As discussed above, in a preferred embodiment, the coupling member 20 includes a series of apertures 22. This allows the coupling member 20 to be adjustable. If the spoiler portion 16 is mounted in a first horizontal position and forward or rearward adjustment (with respect to the orientation of the vehicle 14) of the spoiler portion 16 is desired, the threaded fastener 24 can be removed and the coupling member 20 can be slid in a forward or rearward direction until another aperture 22 is aligned with the aperture 12b in the receiver tube 12a. The threaded fastener 24 is then reinserted through the apertures 12b and 24 and the spoiler portion 16 is now secured in a second horizontal position. This provides a first degree of adjustability to the spoiler portion 16 (illustrated by arrow A in FIG. 3).

In a preferred embodiment of the invention the elongated strut 18 is a bar, tube or the like extending upwardly from the coupling member 20 to the spoiler portion 16. Preferably, the elongated strut 18 provides a second degree of adjustability to the hitch mounted spoiler assembly 10. The elongated strut 18 includes a first section 26 that is secured to the coupling member 20 and a second section 28 that telescopes with the first section 26 and is connected to the spoiler portion 16. The first and second sections 26, 28 slidably engage and are movable relative to one another. As shown in FIG. 1, the first and second sections 26, 28 have a series of apertures 26a, 28a defined therethrough and the second section 28 is slidably received in the first section 26 (the opposite is within the scope of the invention). A threaded fastener (such as a bolt and nut or screw) or the like is inserted through matching apertures 26a, 28a thereby securing the spoiler portion 16 in a first vertical position and preventing movement of first and second sections 26, 28 in a longitudinal direction.

If upward or downward adjustment (with respect to the orientation of the vehicle 14) of the hitch mounted spoiler assembly 10 is desired, the threaded fastener(s) 24 can be removed and the second member 28 can be slid in an upward or downward direction until another aperture 28a is aligned with an aperture 26a in the first member 26. The threaded fastener 24 is then reinserted through the selected apertures 26a, 28a and the spoiler portion 16 is now secured in a second vertical position. This provides a second degree of adjustability to the spoiler portion 16 (illustrated by arrow B in FIG. 3).

In an alternative embodiment, the elongated strut 18 can be an assembly having more than one component that extends upwardly from the coupling member. For example, hitch mounted spoiler assembly can include a plurality of elongated struts 18, whether they be adjustable or not.

The spoiler portion 16 is secured to the elongated strut 18 at or near its top. In a preferred embodiment the spoiler portion 16 is provided with a third degree of adjustability (illustrated by arrow C in FIG. 3), such as angular adjustability, i.e., the spoiler portion 16 is pivotal relative to the intermediate portion 18. As an example, to achieve angular adjustability, the spoiler portion 16 includes a spoiler 17 having at least one adjustment member (such as a split pillow block 30) (four are shown in FIG. 1) attached to the bottom thereof and a cross bar 34. The adjustment members 30 provide an adjustable clamping force on the cross bar 34. In a preferred embodiment, the adjustment members include two mating halves 30a, 30b that are connected by at least one threaded fastener 30c. The two halves 30a, 30b mate to form a hole 32 that receives the cross bar 34 extending horizontally sideways from the elongated strut 18, as shown in FIG. 1. In another embodiment, the adjustment members can be a split locking collar or a taper-lock bushing. To adjust the angular orientation of the spoiler portion 16 from a first angular position the threaded fasteners 30c in the adjustment members 30 are loosened and the spoiler portion 16 is moved angularly as desired. The threaded fasteners 30c are then re-tightened and the spoiler portion 16 is secured in a second angular position. It will be understood that those skilled in the art will be able to make other modifications to the present invention to provide angular adjustability in a different manner. For example, the second section 28 of the elongated strut 18 can include an opening 36 at its top through which cross bar 34 extends, which can be adjustably clamped (like the adjustment members 30) using threaded fasteners or the like. In this example, the adjustment members 30 would not provide the angular adjustability, it would be provided by the opening 36 in the elongated strut 18. Such modifications are within the scope of the present invention. In an alternative embodiment, the assembly 10 includes two cross bars 34 each connected to and extending outwardly from the elongated strut 18.

Figure 2:
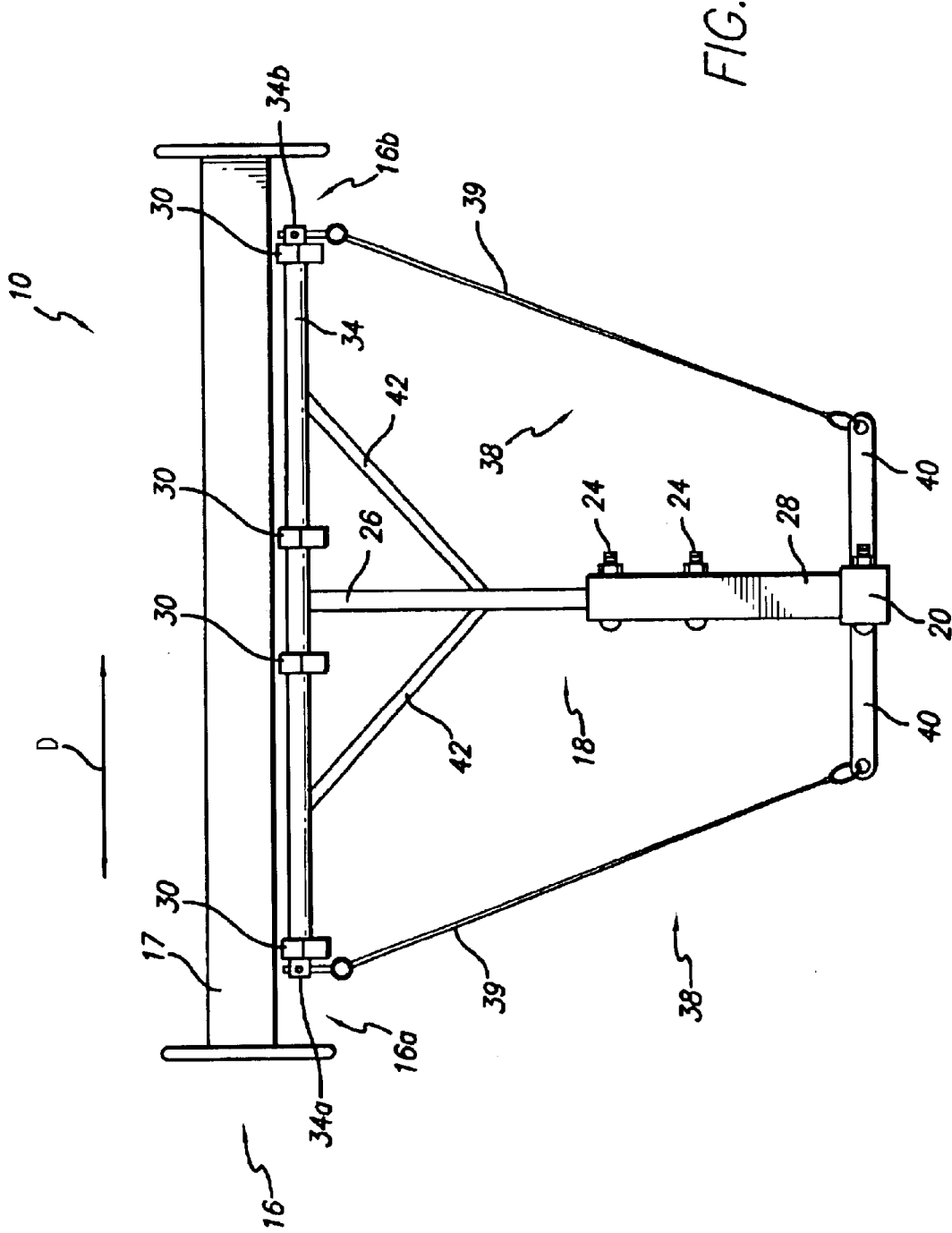
FIG. 2 is a rear elevational view of the spoiler assembly of FIG. 1.

The above description also provides spoiler portion 16 with a fourth degree of adjustability in a side to side direction (illustrated by arrow D in FIG. 2). To adjust the side to side orientation of the spoiler portion 16 from a first side-to-side position the adjustment members 30 are loosened (typically by loosening the threaded fasteners) and the spoiler 17 is moved sideways as desired. The threaded fasteners are then re-tightened and the spoiler portion 16 is secured in a second side to side position.

In a preferred embodiment the hitch mounted spoiler assembly 10 includes stabilization components to stabilize the spoiler portion 16 when subjected to a high amount of airflow, for example, when the vehicle 14 is being driven at high speeds. As an example, as shown in FIG. 1, the hitch mounted spoiler assembly 10 includes at least two stabilization members 38 extending generally downwardly from at or near the opposite ends 16a, 16b of the spoiler portion 16 and that are connected at their opposite ends to the receiver hitch 12 or vehicle frame 13, as shown in FIG. 6. In the embodiment depicted in the figures, the stabilization members 38 are connected to the opposite ends of the cross bar 34.

Figure 4:
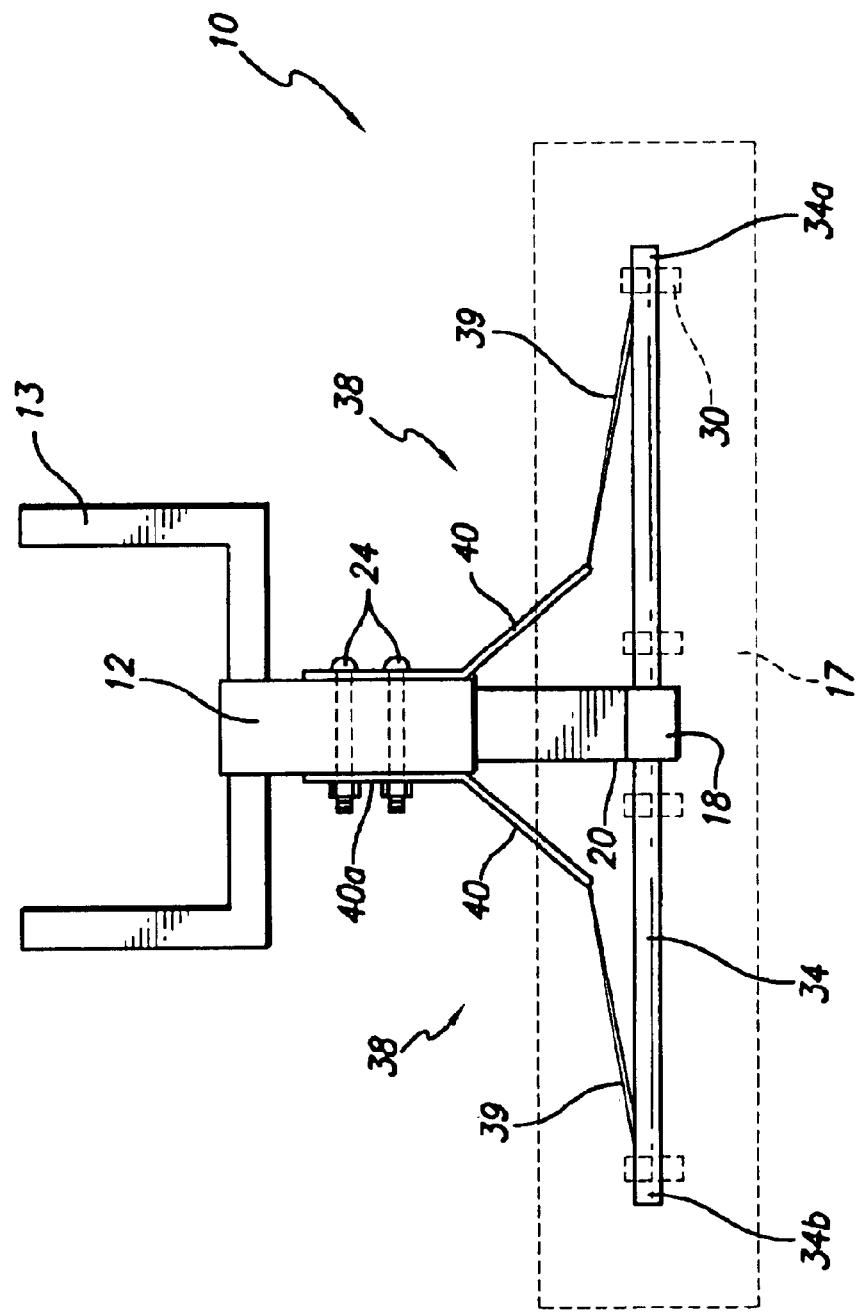
FIG. 4 is a top plan view of the spoiler assembly of FIG. 1 showing the spoiler in phantom.

Referring to FIGS. 1, 2 and 4, the stabilization members 38 can be rigid along their length. For example, the stabilization members 38 can be a rod that is connected at one end to the spoiler portion 16 and at an opposite end to the receiver hitch 12 or frame 13. Preferably the stabilization members 38 include cable members 39 that are connected to stabilization extensions 40 that extend from the receiver hitch 12 or vehicle frame 13. The cable members 39 provide a degree of flexibility to the spoiler portion 16. As shown in FIG. 1, the extensions 40 include at least one aperture 40a that aligns with apertures 22 and 12a and through which threaded fastener 24 can extend to secure the stabilization extensions 40 to the receiver tube 12a. A portion of the stabilization extensions 40 preferably extend rearwardly from the receiver tube 12a at an angle and the stabilization member 38 is connected at or near the end of the stabilization extension 40. When adjusting the spoiler portion 16 vertically the cable portions 39 are lengthened.

In another embodiment the stabilization members 38 can be tie-rods that include a middle tube with one end that has right hand threads and a second end that has left hand threads and two exterior threaded rods that are threaded oppositely and into the ends of the middle tube. The tie-rods are longitudinally adjustable and would be beneficial when the spoiler 17 is adjusted vertically. The stabilization members 38 can also include springs or other shock absorbers. This could allow the spoiler 17 to lie back at a lesser angle when the vehicle 14 is at high speeds. In this embodiment, the adjustment members 30 can be ball bearings, roller bearings or the like that allow the cross bar 34 to turn (and therefore the spoiler 17 to pivot) when enough air passes over the spoiler 17 and creates enough force to overcome the spring in the stabilization members 38. Those skilled in the art will appreciate that in this embodiment the stabilization members 38 would likely be connected directly to the spoiler 17.

To provide further stabilization, the second section 28 of the elongated strut 18 includes at least two rods 42 or the like extending upwardly and outwardly at an angle and are connected to the spoiler portion 16 (and preferably the cross bar 34). In the embodiment of the invention wherein side to side adjustability is provided the rods 42 are omitted as they would prevent the desired adjustability.

In operation, the coupling member 20 is inserted into the vehicle hitch receiver tube 12a and a threaded fastener 24 is placed through any of corresponding apertures 12b and 22 (a hitch pin can also be used) a nut is then placed on the portion of the threaded fastener 24 extending through apertures 12b and 22 on the opposite side from where the threaded fastener 24 was inserted. The elongated strut 18 is then adjusted such that the spoiler 17 extends at a desired point above the rear of the vehicle 14. If the stabilization members are to be used, the stabilization extensions 40 are matched up with apertures 12b and 22 on either side of the receiver tube 12a and then the threaded fastener 24 is inserted.

A second embodiment of a hitch mounted spoiler assembly 60 is shown in FIGS. 5–7. In this embodiment, the hitch mounted spoiler assembly is intended to be used with a blade-type hitch receiver 62 (or draw-bar). This embodiment is similar to the embodiment 10 described above. However, in this embodiment the coupling member 64 is a threaded portion 64a that extends generally downwardly from the cross bar 34. To couple the assembly 60 to the blade-type hitch receiver 62, the threaded portion 64a is inserted into an opening 62a in the blade-type hitch receiver (or draw-bar) and a nut 64b is threaded onto the threaded portion 64a, thereby securing the assembly 60 in place.

In this embodiment, if stabilization members 38 are provided, the stabilization extensions 40 are bolted, welded or otherwise connected directly to the frame 13 or the blade-type hitch receiver 62.

Many alternative embodiments are within the scope of the present invention. For example, the vehicle 14 can be fitted with two hitches, and the assembly 10 or 60 can include two coupling members and two elongated struts connected to the spoiler portion 16. Many other modifications will be apparent to those skilled in the art, and all such modifications are within the scope of the present invention.

What is claimed is:

1. A spoiler assembly comprising:
   (a) a coupling member adapted to be coupled to the hitch receiver of a vehicle,
   (b) an intermediate portion extending upwardly from said coupling portion, and
   (c) a spoiler portion connected to said intermediate portion.

2. The spoiler assembly of claim 1 wherein said intermediate portion has first and second sections, wherein said first section is movable relative to said second section.

3. The spoiler assembly of claim 2 wherein said first and second sections of said intermediate portion are in a telescoping relationship.

4. The spoiler assembly of claim 3 wherein said second section of said intermediate portion is received in said first section, wherein said first and second sections each have a plurality of corresponding apertures defined therein, and wherein a fastener is received in one of said openings in said first section and a corresponding opening in said second section to prevent longitudinal movement of said first section relative to said second section.

5. The spoiler assembly of claim 3 wherein said first section of said intermediate portion is received in said second section, wherein said first and second sections each have a plurality of corresponding openings defined therein, and wherein a fastener is received in one of said openings in said second section and a corresponding opening in said first section to prevent longitudinal movement of said first section relative to said second section.

6. The spoiler assembly of claim 1 wherein said spoiler portion is pivotal relative to said intermediate portion.

7. The spoiler assembly of claim 6 wherein said intermediate portion has first and second opposite ends, wherein said first end has at least one cross bar secured thereto, wherein said second end is affixed to said coupling portion, wherein said spoiler portion includes a spoiler, and wherein said spoiler is connected to and pivotal relative to said cross bar.

8. The spoiler assembly of claim 7 wherein said spoiler portion includes at least one adjustment member secured to said spoiler, and wherein said at least one adjustment member is movable relative to said cross bar.

9. The spoiler assembly of claim 8 wherein said at least one adjustment member has an opening defined therethrough, wherein said opening receives said cross bar, and wherein said at least one adjustment member can be tightened and loosened to allow said spoiler to be movable relative to said cross bar.

10. The spoiler assembly of claim 9 wherein said spoiler portion includes a plurality of adjustment members.

11. The spoiler assembly of claim 1 further comprising at least one stabilization member having first and second opposite ends, wherein said first end is connected to said spoiler portion and said second end is adapted to be coupled to a vehicle.

12. The spoiler assembly of claim 11 wherein said spoiler portion has opposite ends, wherein said spoiler assembly comprises at least two stabilization members extending generally downwardly from said opposite ends of said spoiler portion.

13. The spoiler assembly of claim 12 wherein said spoiler assembly further comprises a cross bar, and wherein said at least two stabilization members extend generally downwardly from said opposite ends of said cross bar.

14. The spoiler assembly of claim 12 wherein said stabilization members each comprise a generally vertically oriented cable member extending downwardly from said opposite ends of said spoiler portion and a stabilization extension having opposite ends, wherein said cable member is affixed to one end of said stabilization extension, and said second end of said stabilization extension is adapted to be coupled to a vehicle.

15. The spoiler assembly of claim 1 wherein said coupling member is adapted to be received in a receiver-type hitch of a vehicle, and wherein said coupling member has at least one aperture defined therethrough adapted to receive a fastener.

16. The spoiler assembly of claim 15 wherein said coupling member has a plurality of openings defined therein.

17. The spoiler assembly of claim 1 wherein said coupling member comprises a threaded portion extending downwardly from said intermediate portion, wherein said threaded portion is adapted to be received in an opening of a draw-bar of a blade-type hitch receiver of a vehicle.

18. A method of affixing a spoiler assembly to a vehicle, the method comprising the step of coupling a coupling portion of said spoiler assembly to a hitch receiver affixed to said vehicle.

19. The method of claim 18 wherein said hitch includes a receiver tube and wherein said method further comprises the steps of inserting said coupling portion into said receiver tube and inserting a fastener through an aperture in said receiver tube and a corresponding aperture in said coupling portion.

20. The method of claim 18 wherein said hitch includes a draw-bar having an opening therein, and wherein said coupling portion includes a threaded portion, and wherein the method further comprises the steps of inserting said coupling portion into said opening in said draw-bar and threading a nut onto said threaded portion.

21. A spoiler assembly comprising:
   (a) a coupling member adapted to be received in a receiver-type hitch of a vehicle, wherein said coupling member has a plurality of apertures defined therethrough,
   (b) an intermediate portion extending upwardly from said coupling portion, said intermediate portion having first and second sections that are in a telescoping relationship, wherein said second section of said intermediate portion is received in said first section, wherein said first and second sections each have a plurality of corresponding apertures defined therein, and wherein a fastener is received in one of said openings in said first section and a corresponding opening in said second section to prevent longitudinal movement of said first section relative to said second section,
   (c) a spoiler portion having opposite ends and connected to said intermediate portion, said spoiler portion including
      (1) a cross bar affixed to said second portion of said intermediate portion,
      (2) a spoiler, and
      (3) a plurality of adjustment members affixed to said spoiler, said adjustment members each having an opening defined therethrough, wherein said openings receive said cross bar, and wherein said adjustment members each include at least one threaded fastener that can be tightened and loosened to allow said spoiler to be movable relative to said cross bar,
   (d) at least two stabilization members, each including
      (1) a generally vertically oriented cable member extending downwardly from an end of said spoiler portion, and
      (2) a stabilization extension having opposite ends, wherein one of said cable members is affixed to one end of said stabilization extension, and said second end of said stabilization extension is adapted to be coupled to a receiver tube of said receiver-type hitch.

22. A spoiler assembly comprising:
(a) a coupling member adapted to be received in a receiver-type hitch of a vehicle, wherein said coupling member has a plurality of apertures defined therethrough,
(b) an intermediate portion extending upwardly from said coupling portion, said intermediate portion having first and second sections that are in a telescoping relationship, wherein said second section of said intermediate portion is received in said first section, wherein said first and second sections each have a plurality of corresponding apertures defined therein, and wherein a fastener is received in one of said openings in said first section and a corresponding opening in said second section to prevent longitudinal movement of said first section relative to said second section, and
(c) a spoiler portion having opposite ends and connected to said intermediate portion, said spoiler portion including
  (1) a cross bar affixed to said second portion of said intermediate portion,
  (2) a spoiler, and
  (3) a plurality of adjustment members affixed to said spoiler, said adjustment members each having an opening defined therethrough, wherein said openings receive said cross bar, and wherein said adjustment members each include at least one threaded fastener that can be tightened and loosened to allow said spoiler to be movable relative to said cross bar.

* * * * *